T. O. PETERSON.
DEVICE FOR EXHIBITING ARTICLES OF MERCHANDISE.
APPLICATION FILED JUNE 15, 1912.
1,060,787.
Patented May 6, 1913.
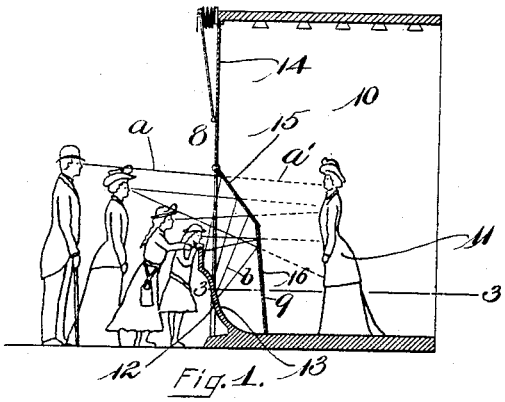
Fig. 1.
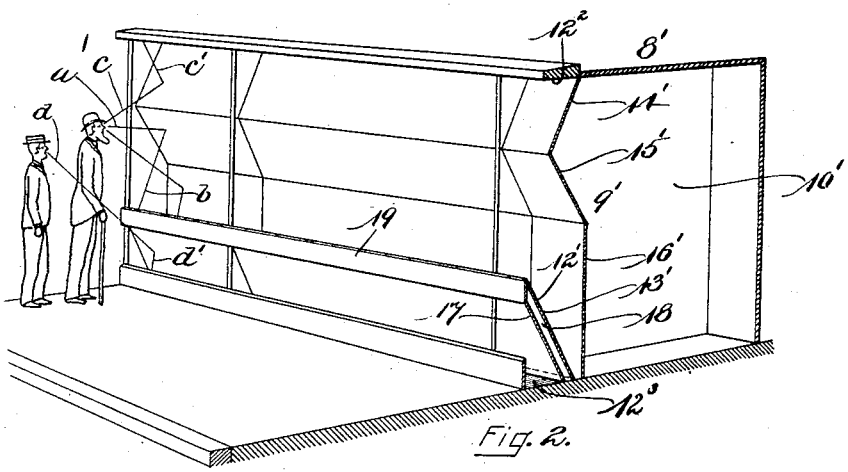
Fig. 2.
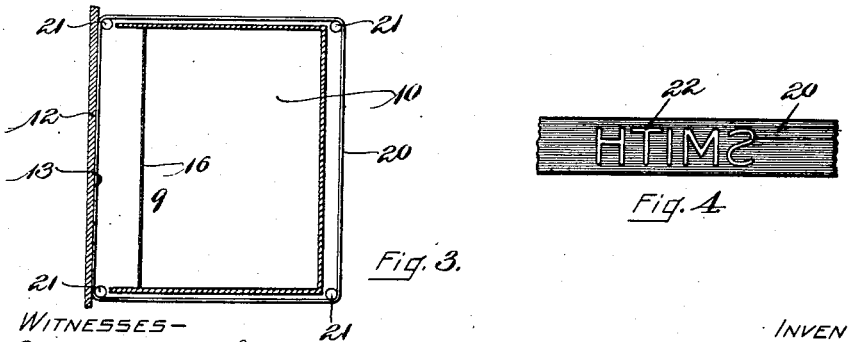
Fig. 3.
Fig. 4.
WITNESSES—
Franklin E. Low
Sydney E. Taft
INVENTOR—
Tron O. Peterson.
By his Attorney
Charles N. Gording.

UNITED STATES PATENT OFFICE.

TRON O. PETERSON, OF NEW YORK, N. Y., ASSIGNOR TO STORE IMPROVEMENT COMPANY, INC., OF NEW YORK, N. Y.

DEVICE FOR EXHIBITING ARTICLES OF MERCHANDISE.

1,060,787. Specification of Letters Patent. Patented May 6, 1913.

Application filed June 15, 1912. Serial No. 703,843.

*To all whom it may concern:*

Be it known that I, TRON O. PETERSON, a citizen of the United States, residing at New York, in the county of New York and State of New York, have invented new and useful Improvements in Devices for Exhibiting Articles of Merchandise, of which the following is a specification.

This invention relates to an improved device for exhibiting articles of merchandise, the same being particularly adapted to the windows of stores and to show cases.

The object of the invention is to remove the reflection in the glass of the store window or show case of objects in front of said glass.

It is very important that articles placed in the show windows of a store should be clearly seen by observers upon the sidewalk and it is a well known fact that in the ordinary window, consisting of a vertical plate of glass, a reflection is obtained from said plate of glass of objects in the street or upon the opposite side of the street, which very much confuses the observer and interferes with the clear view of the articles of merchandise placed in the chamber, at the rear of said glass for purposes of exhibition.

My improved device renders it practicable for the observer in front of a store window to obtain a perfectly clear view of articles placed in said window without the reflection of objects in the street or in buildings upon the opposite side of the street, so that the attention of the observer is not attracted from the articles in the window, while at the same time the articles in the window are protected by a glass or transparent front.

The invention consists in a device for exhibiting articles of merchandise comprising in its construction a transparent partition and an opaque partition located in front of said transparent partition and extending vertically partly thereacross, said opaque partition having a non-reflecting surface on the side thereof adjacent to said transparent partition.

The invention again consists in the instrumentalities hereinbefore set forth, said transparent partition being located at an angle to a vertical plane and again in a transparent partition formed of two plates located at an angle to each other and to a vertical plane, in combination with said opaque partition provided with a non-reflecting surface adjacent to said transparent partition.

The invention again consists in providing between the non-reflecting surface and transparent partition hereinbefore set forth a reflecting surface in any desired form, such as letters or figures, whereby a reflection or phantom picture of said letters or figures is carried to the eye of the observer and appears to float between said observer and the back of said transparent partition in the place where the articles of merchandise are located.

The invention again consists in providing a movable screen with a non-reflecting surface thereon, having letters or figures formed upon said surface so as to produce a series of moving figures or letters in the space behind the transparent partition in which the articles of merchandise are exposed to view, thus attracting the attention of the observer from the front of the window, the whole constituting a very novel advertising means and quickly attracting the attention of the observer located outside or in front of the transparent partition or glass.

The invention finally consists in the combination and arrangement of parts set forth in the following specification and particularly pointed out in the claims thereof.

Referring to the drawings: Figure 1 is a vertical transverse section of a store show window constructed in accordance with my invention with figures of persons of different heights on the sidewalk in front of the window and with a figure of a model behind said window in the space or chamber reserved for the exhibition of articles of merchandise. Fig. 2 is a perspective view of a modified form of my invention with figures of two persons to illustrate the operation of the device. Fig. 3 is a plan section taken on line 3—3 of Fig. 1, illustrating attached thereto a movable opaque shade or partition. Fig. 4 is a detail elevation viewed from the right of Fig. 3 of a portion of said movable partition.

Like numerals refer to like parts throughout the several views of the drawings.

In the drawings, Fig. 1, 8 is a store window constructed in accordance with my invention, comprising a transparent partition 9, preferably of glass. Upon one side of said glass partition is a chamber 10 in which articles of merchandise, such as dress models 11, and the like are exhibited. 12 is an opaque partition located in front of the transparent partition 9, extending entirely thereacross horizontally and partly thereacross vertically. The inner face 13 of the opaque partition 12 adjacent to the transparent partition 9 has a non-reflecting surface, preferably black. The transparent partition illustrated in Fig. 1 consists of three plates of glass 14, 15 and 16, the plates 15 and 16 being arranged at such angles to each other and to a vertical plane that objects outside of said show window instead of being reflected by the glass to the eye of an observer standing outside said window are reflected upon a non-reflecting surface upon the inside of the opaque partition 12, as, for instance, referring to Fig. 1, the lines "a" indicate the line of vision from the observer to the glass plates 15 and 16 and the lines "b" the direction in which a ray of light would be reflected which passed along the line "a" and impinged against the plates 15 and 16. Thus, said ray of light would be reflected against the dead black inner face 13 of the opaque partition 12 and would not be returned by said partition to the eye of the observer to cause confusion and a reflection of objects outside the window. Therefore, the line of vision $a$ would be continued as indicated in dotted lines $a'$ in said Fig. 1 to the object displayed upon the opposite side of the transparent partition. The plates of glass 15 and 16, therefore, are placed at such angles to each other and to a vertical plane that the reflection of objects outside the window, below the height of a man six feet in height and above the height of a child three feet in height, would be reflected against the dark background of the opaque partition 12.

In Fig. 2 a modification of my improved store window is illustrated in which 8' is the store window, as a whole, 9' the transparent partition, 10' the chamber, 12' the opaque partition having a non-reflecting inner face 13'. 14', 15' and 16' are plates of glass arranged at an angle to each other and to a vertical plane and forming, as a whole, the transparent partition 9'. The opaque partition 12' is also known as a shadow box and in the form illustrated in Fig. 2, three of said shadow boxes are provided, viz, the shadow box 12', a shadow box $12^2$ and a shadow box $12^3$. The shadow box $12^2$ is provided to prevent reflection to the eye of the observer from the plate 14' and the shadow box $12^3$ is provided to prevent the reflections to the eye of the observer from the glass plate 17, which, in this instance, forms a transparent partition in front of a show case 18 which contains small articles such as can be inserted below the hand rail 19. By reference to Fig. 2 it will be seen that the line of vision $a$ is reflected in the direction $b$ to the shadow box 12'. The line of vision $c$ is reflected along the line $c'$ to the shadow box $12^2$, and the line of vision $d$ is reflected in the direction $d'$ to the shadow box $12^3$, so that from the top to the bottom of the show window illustrated in Fig. 2, the plates of glass are arranged at such angles and the shadow boxes are so placed in front of said plates of glass, between the same and the observer standing upon the sidewalk, that no reflection of objects outside said show window can be obtained by the observer standing upon the sidewalk in front of said show window to cause confusion and to interfere with the clear view of articles placed either in the chamber 9' or in a show case compartment 18.

For purposes of attracting attention and exciting the curiosity of observers upon the sidewalk, figures, letters or other advertising matter, such as the name of the firm, or any desired words or combinations of words may be placed between the non-reflecting inner face 13 of the opaque partition 12 and the transparent partition 9, and said figures or letters may be of material having a polished or reflecting surface, so that the same will be reflected, for instance, in Fig. 1, along the lines $b$, $a$ to the eye of the observer, and said eye will transfer said reflection along the lines $a$ and $a'$, thus producing a phantom picture or reproduction of the lettering or figures which may be placed upon the inner face of the opaque partition 12. It is also evident that said figures may be placed upon a moving shade or belt, as illustrated in Figs. 3 and 4, in which a movable belt 20 passes along the inner face 13 of the opaque partition 12 and around pulleys 21, 21 at each side of the window 8 and longitudinally thereacross, both in front of the partition 9 and at the rear of the chamber 10. Upon this belt, which is preferably black and non-reflecting, are placed letters having a reflecting or polished surface and constituting reflectors, and these letters 22 are reversed upon the belt, as illustrated in Fig. 4. As said belt is operated to travel across the front of the transparent partition 9 and behind the opaque partition 12, the letters 22 will be reflected from the plate 16 to the eye of the observer, thus immediately attracting attention and forming an excellent advertising medium.

While I prefer to arrange the transparent partition and the opaque partition in substantially the relative locations indicated in the drawings, it is evident that they may be placed in different positions without departing from the spirit of my invention, so long as the shape or position of the glass partition is such relatively to the opaque partition that the reflection of objects outside the show window will be projected from the glass to the opaque partition and not returned to the eye of the observer to cause confusion and interfere with a clear view of articles placed in the chamber 9' or in the show case compartment 18, the position of the reflecting surface being such with relation to the transparent partition that figures, letters, pictures or other advertising matter will be reflected from the transparent surface to the eye of the observer.

Having thus described my invention, what I claim and desire by Letters Patent to secure is:

1. A device for exhibiting articles of merchandise comprising in its construction a transparent partition and an opaque partition located in front of said transparent partition and extending vertically partly thereacross.

2. A device for exhibiting articles of merchandise comprising in its construction a transparent partition and an opaque partition located in front of said transparent partition and extending vertically partly thereacross, said opaque partition having a non-reflecting surface on the side thereof adjacent to said transparent partition.

3. A device for exhibiting articles of merchandise comprising in its construction a transparent partition and an opaque partition located in front of said transparent partition and extending vertically partly thereacross, said opaque partition having a non-reflecting surface on the side thereof adjacent to said transparent partition, and a reflector located between said non-reflecting surface and transparent partition.

4. A device for exhibiting articles of merchandise comprising in its construction a transparent partition and an opaque partition located in front of said transparent partition and extending vertically partly thereacross, said opaque partition having a non-reflecting surface on the side thereof adjacent to said transparent partition, and a reflecting surface superimposed upon said non-reflecting surface.

5. A device for exhibiting articles of merchandise comprising in its construction a transparent partition and an opaque partition located in front of said transparent partition and extending vertically partly thereacross, said opaque partition having a surface adjacent to said transparent partition formed partly of reflecting and partly of non-reflecting material.

6. A device for exhibiting articles of merchandise comprising in its construction a transparent partition and an opaque partition located in front of said transparent partition and extending vertically partly thereacross, said opaque partition having a non-reflecting surface on the side thereof adjacent to said transparent partition, and a movable reflector located between said non-reflecting surface and transparent partition.

7. A device for exhibiting articles of merchandise comprising in its construction a transparent partition and an opaque partition located in front of said transparent partition, said transparent partition located at an angle to a vertical plane.

8. A device for exhibiting articles of merchandise comprising in its construction a transparent partition and an opaque partition located in front of said transparent partition, said transparent partition formed of two plates located at an angle to each other and to a vertical plane.

9. A device for exhibiting articles of merchandise comprising in its construction a transparent partition formed of a plurality of plates located at an angle to each other and to a vertical plane, and a plurality of opaque partitions located in front of said transparent partition.

10. A device for exhibiting articles of merchandise comprising in its construction a transparent partition formed of a plurality of plates located at an angle to each other and to a vertical plane and a plurality of opaque partitions located in front of said transparent partition, said opaque partitions each having a non-reflecting surface on the side thereof adjacent to said transparent partition.

11. A device for exhibiting articles of merchandise consisting of a glass partition having upon one side thereof a chamber to receive said articles of merchandise and upon the opposite side thereof a shadow box.

12. A device for exhibiting articles of merchandise comprising in its construction a glass partition and a shadow box located in front of said partition.

13. A store window comprising in its construction a plate of glass and an opaque partition located in front of said plate of glass, said opaque partition having a non-reflecting surface on the side thereof adjacent to said plate of glass.

14. A store window comprising in its construction a plurality of plates of glass located at an angle to each other and to a vertical plane and a plurality of opaque partitions located in front of said plates of glass.

15. A store window comprising in its construction a plurality of plates of glass located at an angle to each other and to a vertical plane and a plurality of opaque partitions located in front of said plates of glass, each of said opaque partitions provided with a non-reflecting surface upon the side thereof adjacent to said plates of glass.

16. A device for exhibiting articles of merchandise consisting of a transparent partition and an opaque partition located adjacent to said transparent partition and at an angle thereto.

In testimony whereof I have hereunto set my hand in presence of two subscribing witnesses.

TRON O. PETERSON.

Witnesses:
R. E. DISNEY,
T. H. DUNN.

Copies of this patent may be obtained for five cents each, by addressing the "Commissioner of Patents. Washington, D. C."